US011090785B2

(12) United States Patent
Singh et al.

(10) Patent No.: US 11,090,785 B2
(45) Date of Patent: Aug. 17, 2021

(54) QUICK-CONNECT CHUCK MECHANISM FOR SCREWDRIVER BITS AND THE LIKE

(71) Applicant: Maxtech Consumer Products Limited, Waterloo (CA)

(72) Inventors: Satnam Singh, Kitchener (CA); Kailash C Vasudeva, Waterloo (CA)

(73) Assignee: Maxtech Consumer Products Limited, Waterloo (CA)

( * ) Notice: Subject to any disclaimer, the term of this patent is extended or adjusted under 35 U.S.C. 154(b) by 494 days.

(21) Appl. No.: 16/226,939

(22) Filed: Dec. 20, 2018

(65) Prior Publication Data

US 2019/0143493 A1   May 16, 2019

Related U.S. Application Data

(62) Division of application No. 15/305,511, filed as application No. PCT/CA2015/050334 on Apr. 22, 2015, now abandoned.

(60) Provisional application No. 61/982,637, filed on Apr. 22, 2014.

(51) Int. Cl.
*B25B 23/00* (2006.01)
*B23B 31/107* (2006.01)

(52) U.S. Cl.
CPC ...... *B25B 23/0035* (2013.01); *B23B 31/1071* (2013.01); *B23B 31/1072* (2013.01); *B23B 2231/46* (2013.01)

(58) Field of Classification Search
CPC ............ B25B 23/0035; B25B 23/0042; B23B 31/1071; B23B 31/1072; F16D 1/116; F16D 1/165

USPC ........................................................ 403/322.2
See application file for complete search history.

(56) References Cited

U.S. PATENT DOCUMENTS

| 751,345 A | 2/1904 | Saunders |
| 2,395,534 A | 2/1946 | Cook |
| 5,398,946 A * | 3/1995 | Quiring ............... B23B 31/1071 279/145 |
| 5,536,106 A * | 7/1996 | Landis ..................... B62D 1/10 280/779 |

(Continued)

OTHER PUBLICATIONS

International Search Report of PCT/CA2015/050334.

(Continued)

*Primary Examiner* — Bryan R Muller
(74) *Attorney, Agent, or Firm* — Dickinson Wright LLP; Matthew D. Powell (57) ABSTRACT

A bit holder has a shank at a proximal end thereof and a blind bit-accepting hole at a distal end thereof, shaped to receive a correspondingly-shaped tool bit. The bit holder has at least one locking mechanism comprising an opening defined in the bit holder, opening into a side of the bit-accepting hole. A locking element in the opening is moveable towards the opening to contact a tool bit in the bit-accepting hole. The bit holder has a sleeve around a body portion of the bit holder, overlying the opening and biased by a spring towards a normal position. The sleeve has an internal ramp angled to contact the locking element to urge the locking element towards the tool bit as the sleeve is moved into the normal position, and to accommodate the locking element when the sleeve is moved from the normal position against the force of the spring.

6 Claims, 9 Drawing Sheets

(56) References Cited

U.S. PATENT DOCUMENTS

| | | | |
|---|---|---|---|
| 6,053,675 A * | 4/2000 | Holland | B23B 31/1072 |
| | | | 408/239 R |
| 6,261,035 B1 | 7/2001 | Moores, Jr. et al. | |
| 6,347,914 B1 | 2/2002 | Boyle et al. | |
| 6,474,656 B1 * | 11/2002 | Thomas | B23B 31/1071 |
| | | | 279/30 |
| 7,121,774 B2 | 10/2006 | Hirt et al. | |
| 7,896,355 B2 * | 3/2011 | Wienhold | B23B 31/1071 |
| | | | 279/22 |
| 8,308,168 B2 * | 11/2012 | Nash | B25B 23/0035 |
| | | | 279/74 |
| 9,469,020 B2 | 10/2016 | Funk et al. | |

OTHER PUBLICATIONS

Written Opinion of PCT/CA2015/050334.
Office Action dated Nov. 20, 2018 issued in respect of co-pending U.S. Appl. No. 15/305,511.
Response to Office Action dated Dec. 14, 2018 in co-pending U.S. Appl. No. 15/305,511.
Office Action dated Mar. 1, 2019 issued in respect of co-pending U.S. Appl. No. 15/305,511.

* cited by examiner

QUICK-CONNECT CHUCK MECHANISM FOR SCREWDRIVER BITS AND THE LIKE

CROSS-REFERENCE TO RELATED APPLICATIONS

This application is a divisional of U.S. application Ser. No. 15/305,511, filed Oct. 20, 2016, which is a U.S. National Stage Filing under 35 U.S.C. § 371 from International Application No. PCT/CA2015/050334, filed 22 Apr. 2015, which claims all benefit and priority of U.S. Provisional Application Ser. No. 61/982,637, filed 22 Apr. 2014; the entire contents and disclosure of each such application is incorporated herein by reference.

BACKGROUND

This invention relates to a quick-change tool bit holder that can secure a tool bit by using a wedging element on its external profile. This kind of locking in a quick change holder provides substantially "no play" holding of a tool bit. The wedging element moves in a guided angular path within the body of the holder, the path making a self-locking acute angle with the centre axis of the holder.

The invention will normally be used for standard hexagonal bits. However, the invention can be readily adapted for use with bits having any polygonal cross-section, including square bits for example, as well as for use with bits having a non-polygonal cross-section, for example ovaloid bits with two flats and two arcs, or tri-centric bits with three flats and three arcs. In general, the invention can be adapted for use with virtually any non-circular cross-section. Typical quick change tool bit holders on the market use some kind of a locking device that engages a circumferential groove per ANSI B 107.4-1982 or an edge notch per ASME B107.600-2008 (B107.26) on the hex shank of a tool bit, resulting in restricting axial freedom of the same.

Because of inherent features of the circumferential groove in the tool bits, the locking mechanism in each case is of a binary nature. This means the conditions are either, on or off, grabbed or released, locked or unlocked, etc. Due to the stack-up of tolerances in such bit holder devices, coupled with manufacturing tolerances of tool bits, there is generally excessive axial and radial play between the tool bits and the tool bit holder. Tradespersons and do-it-yourselfers accustomed to using solid screw drivers or driver/drill bits directly chucked into a hand drill strongly dislike the resulting sloppy functioning of these quick change holders.

SUMMARY OF THE INVENTION

The quick change tool bit holder presented here offers quick interchangeability of tool bits without compromising the feel of a solid chuck, by providing a substantially no-play hold on the tool bit. The design is based upon at least one angularly guided locking element, the path of which makes a self-locking acute angle 'A' with the center axis of the bit holder. This locking element acts as a wedge against the outer surface of the tool bit, hence locking the bit against axial and radial freedom.

Further details of the invention will be described or will become apparent in the course of the following detailed description and drawings of embodiments of the invention, presented as examples only.

DETAILED DESCRIPTION

Figure 26:
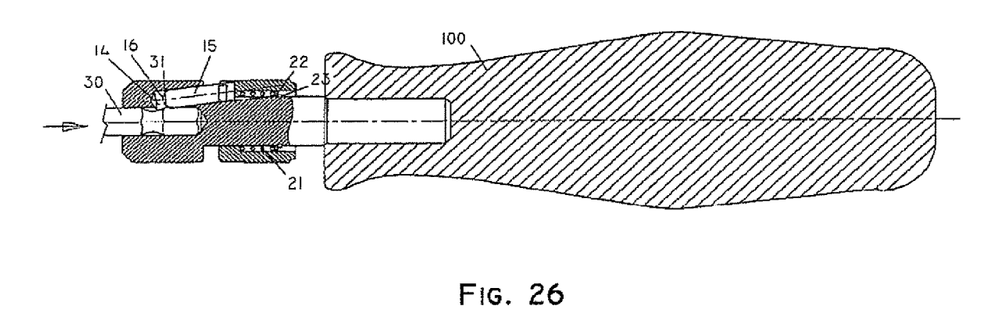
FIG. 26 is a side cross-section of an example of the mechanism combined with a typical screwdriver handle.

FIGS. 1-4B shows a first example of the invention. The main body of the bit holder 10 has a shank 11 and a bit-accepting end 12 with a blind bit-accepting hole 13 having a profile to match the profile of the tool bit 30. The profile will normally be hexagonal, but as stated above, the invention can be adapted for use with bits of basically any non-circular cross-section. The shank 11 normally will be mounted in, for example, a screwdriver handle, as shown in FIG. 26.

At least one pin 15, preferably but not necessarily cylindrical for ease of manufacturing, acts as a locking element. In the drawings and throughout this description, generally only one locking element will be described, for convenience. However, to achieve maximum "no play" performance, there should preferably be more than one locking element. Preferably, there may be three of them, offset at 120 degrees from each other.

Figure 4A:
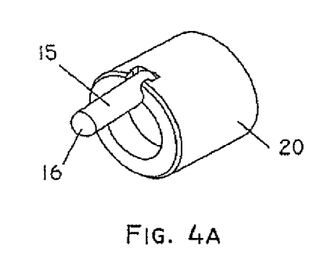
FIG. 4A is a perspective view showing the sleeve and pin of FIGS. 1 to 3B.
Figure 4B:
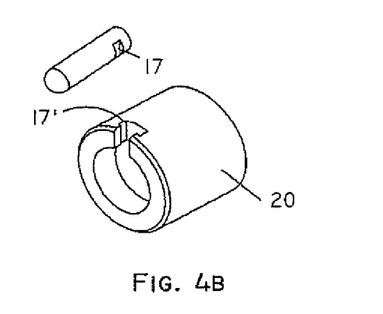
FIG. 4B is an exploded perspective view corresponding to FIG. 4A.
Figure 5:
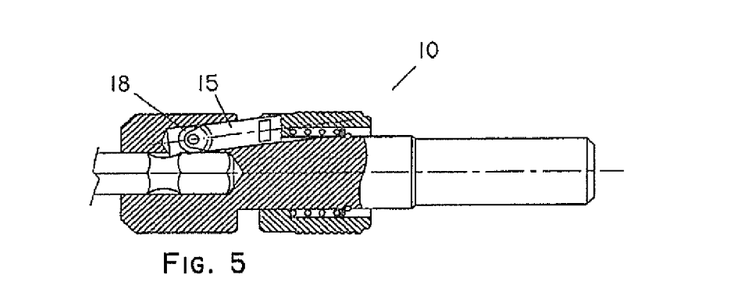
FIG. 5 is a side cross-section of a second example of the invention, using a pin and a roller actuated by the spring-loaded sleeve, shown with a tool bit inserted.
Figure 6A:
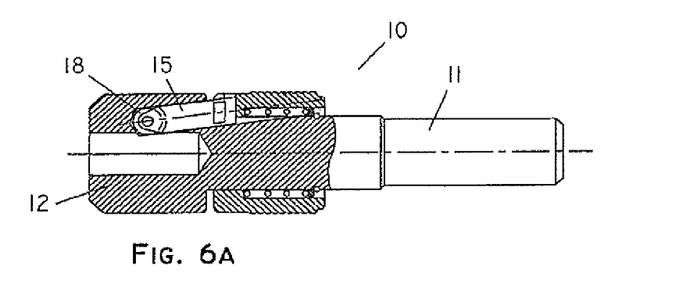
FIG. 6A is a cross-section corresponding to FIG. 5, without the tool bit.
Figure 6B:
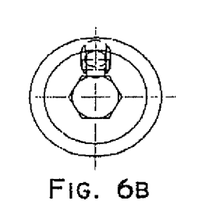
FIG. 6B is an end view corresponding to FIG. 6A.
Figure 7A:
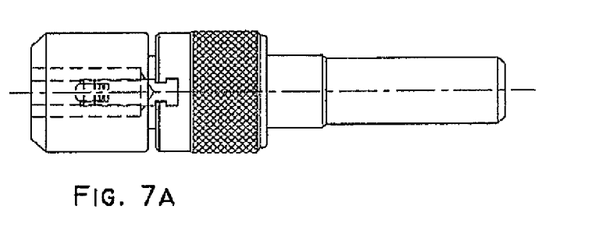
FIG. 7A is a top view at 90 degrees to FIGS. 5 and 6A.
Figure 7B:
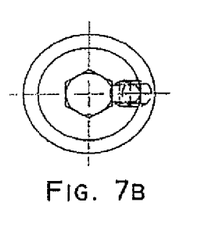
FIG. 7B is an end view corresponding to FIG. 7A.
Figure 8:
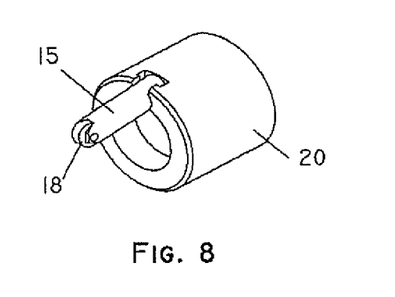
FIG. 8 is a perspective view showing the sleeve, pin and roller of FIGS. 5 to 7A.

The pin 15 preferably has a semi-spherical tip 16, and is slideable and guided in an angularly formed path 14, the path 14 partially opening into the bit-accepting hole 13 such that the tip 16 extends slightly into the bit-accepting hole 13. As best seen in FIGS. 4A and 4B, the pin 15 is anchored to a slideable sleeve 20, by a slot near 17 the end of the pin and a notch 17' in the sleeve. When the pin connects to the sleeve, the end of the pin sits in the notch and the outside of the notch sits in the slot so as to anchor the pin to the sleeve.

Figures 2A, 2B:
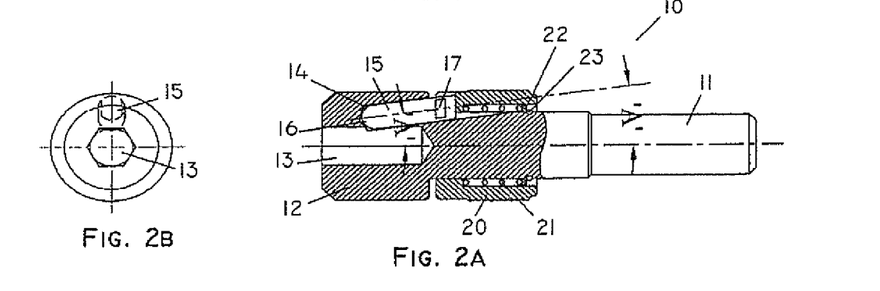
FIG. 2A is a cross-section corresponding to FIG. 1, but without the tool bit.
FIG. 2B is an end view corresponding to FIG. 2A.
Figure 3A:
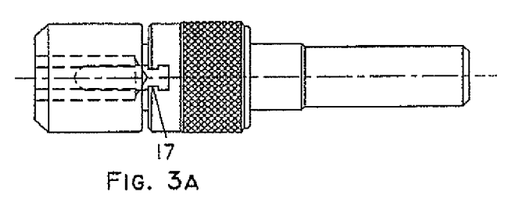
FIG. 3A is a top view at 90 degrees to FIGS. 1 and 2A.
Figure 3B:
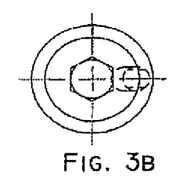
FIG. 3B is an end view corresponding to FIG. 3A.

The angle A at which the path 14 is offset from the axis of the bit holder is preferably in the range of 5 to 13 degrees. Too large an angle increases the diameter of the mechanism excessively, and reduces the effectiveness of the locking. Conversely, too small an angle increase the length of the mechanism, and ultimately also reduces the effectiveness of the unlocking.

Figure 1:
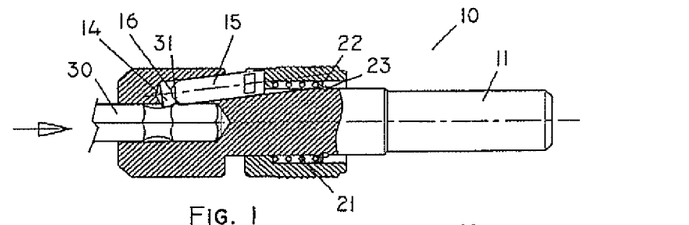
FIG. 1 is a side cross-section of a first example of the invention, using a pin actuated by a spring-loaded sleeve, shown with a tool bit inserted.

The sleeve 20 is biased towards the distal end of the holder, i.e., towards the open end of the bit-accepting hole 13, by a spring 21 that has its one flat face against the sleeve 20 while the other face is against a stop ring 22. The stop ring 22 is retained by lock ring 23 sitting in a recess in the main body 10. Axial sliding movement of sleeve 20 results in angularly sliding movement of element 15 within the guided path 14 of the body.

When a tool bit 30 is axially inserted into the bit-accepting hole 13, it engages with the tip 16 of the element 15, pushing the element 15 and in turn the sleeve 20 towards the shank 11. As the insertion of tool bit 30 continues, the element 15 is pushed fully out of the bit-accepting hole 13 and the tip 16 is in contact with the external surface 31 of the bit 30 until the bit stops against the terminating end of bit-accepting hole 13. Due to the spring biasing, the tip 16 of element 15 is continuously pushed against the outer surface 31 of the tool bit 30, resulting in wedging and clamping the bit 30 inside the bit-accepting hole 13. Any effort to pull the tool bit 30 out from the bit-accepting hole 13 only further tightens the grip on the tool bit. This kind of locking ensures "no play" fitment of the tool bit in the holder. In order to release the tool bit 30, the sleeve 20 must be pulled back towards the shank 11 of the body 10, against the force of the spring 21, thus withdrawing the tip 16 from surface 31 and therefore freeing the tool bit 30 for removal.

As shown in FIG. 2A, the angular path makes an acute angle "A" with the center axis of the bit holder. Preferably, to make the pressing force between the pin 16 and the bit 30 more effective for preventing axial movement of the bit 30 in the bit-accepting hole 13, the acute angle "A" is less than 20 degrees, and preferably less than 15 degrees. In the drawings, a preferred angle of 10 degrees is shown.

A second example of the invention is shown in FIGS. 5-8. The mechanism is essentially identical to that of FIGS. 1-4B, except that the sliding element 15 has a freely rotating roller 18 that replaces tip 16 of the pin 15. This is most clearly seen in FIG. 8.

Figure 9:
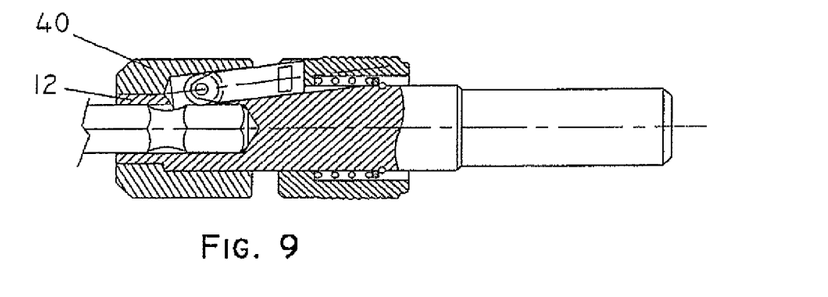
FIG. 9 is a side cross-section of a third example of the invention, very similar to the second example, but with the bit-holder body in two pieces.

FIG. 9 shows a third example of the invention, which is a slightly modified version of the first and second examples. In this example, the angular path for the locking element is formed partially as a slot in portion 12 of the body 10 and partially into a coaxial collar 40 press fitted onto the end 12. With this split construction there is better access to the guide path during manufacturing, to produce a polished finish with less friction.

Figure 10A:
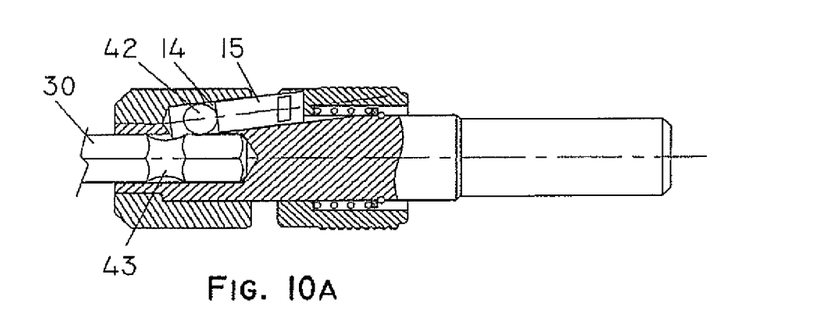
FIG. 10A is a side cross-section of a fourth example of the invention, very similar to the previous examples, but using a ball.
Figure 10B:
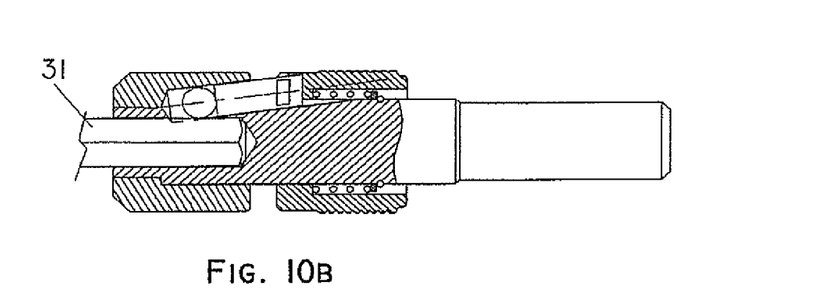
FIG. 10B is a side cross-section where the mechanism is identical to that of FIG. 10A, simply illustrating that for all embodiments the locking does not depend on the bit having a circumferential groove.
Figure 11:
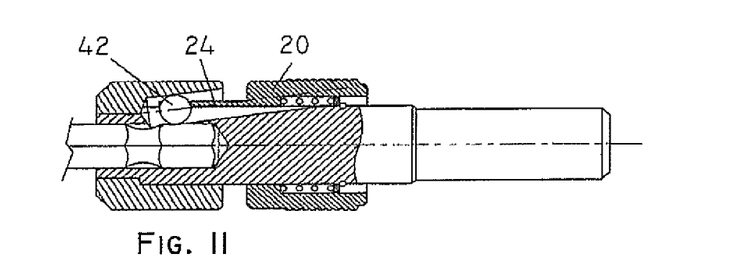
FIG. 11 is a side cross-section of a fifth example of the invention, using a ball holder and a ball actuated by a spring-loaded sleeve, shown with a tool bit inserted.
Figures 12A, 12B:
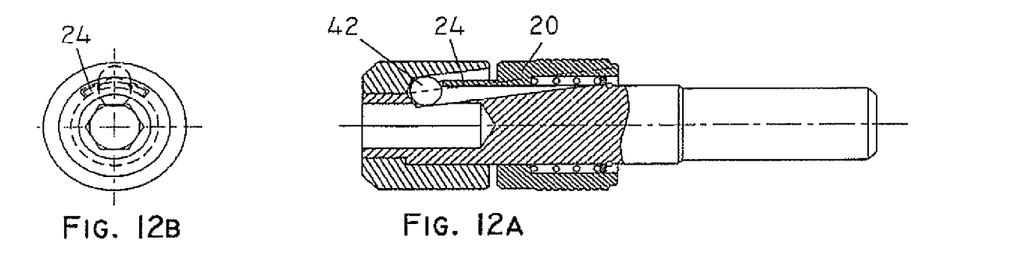
FIG. 12A is a cross-section corresponding to FIG. 11, without the tool bit.
FIG. 12B is an end view corresponding to FIG. 12A.
Figure 13A:
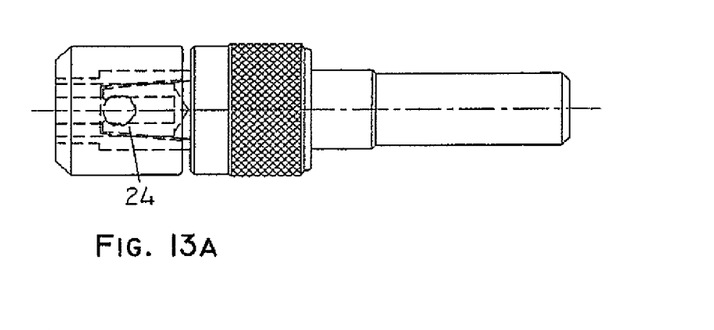
FIG. 13A is a top view at 90 degrees to FIGS. 11 and 12A.
Figure 13B:
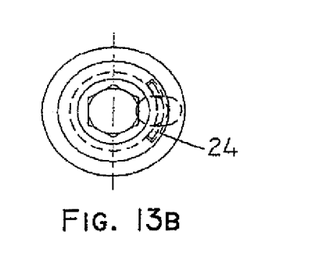
FIG. 13B is an end view corresponding to FIG. 13A.

FIGS. 10A and 10B show a fourth example of the invention, where the bit locking element is a spherical ball 42 positioned at the distal end of the pin 15 within the angular path 14. The bit locking function is the same as shown in the earlier examples of the invention.

FIG. 10B is identical to FIG. 10A, except that it illustrates that the invention can be used not only with bits having a conventional circumferential groove 43 near their proximal ends (FIG. 10A), but also with bits having no such groove.

Figure 14:
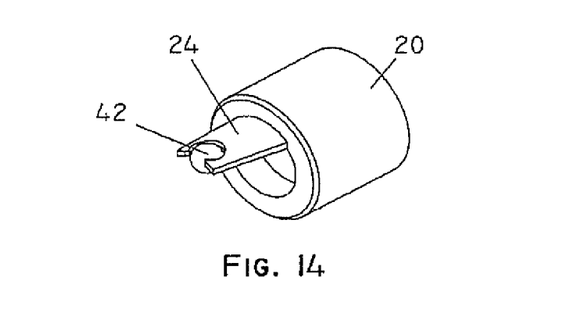
FIG. 14 is a perspective view showing the sleeve, ball holder and ball of FIGS. 11 to 13A.

FIGS. 11-14 show a fifth example of the invention, which is similar to the fourth example (FIGS. 10A and 10B). In this example, the locking element is a spherical ball 42, but it is anchored to an extended hook portion 24 of sleeve 20, as best seen in FIG. 14.

Figures 15A, 15B:
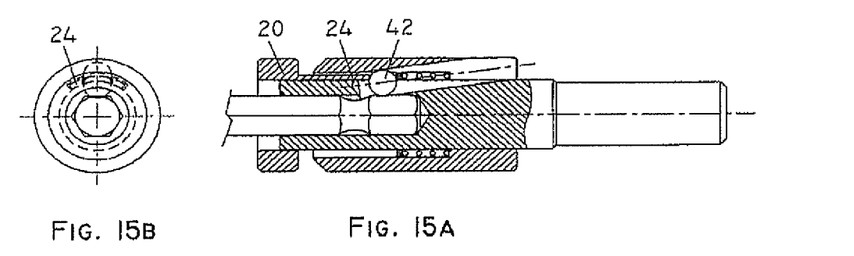
FIG. 15A is a side cross-section of a sixth example of the invention, where the sleeve is placed in front of the open end of the body/housing, shown with a tool bit inserted.
FIG. 15B is an end view corresponding to FIG. 15A.

FIGS. 15A and 15B show a sixth example, which is a variation of the fifth example (FIGS. 11-14). In this sixth example, the sleeve 20 is placed in front of the open end of the body/housing. The locking function is the same as in the previous examples, but in this case, to release the bit, the movement of the sleeve pushes the ball 42 away from its locking position instead of pulling it away.

Figures 16A, 16B:
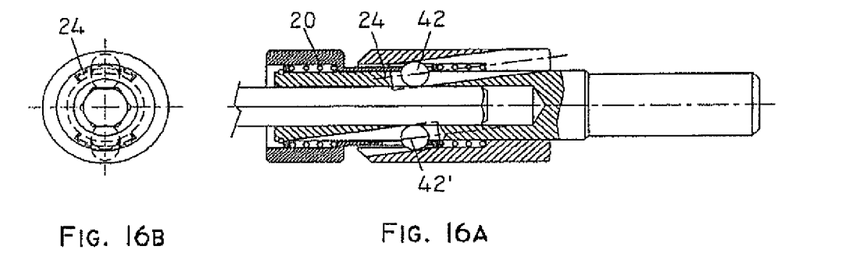
FIG. 16A is a side cross-section of a seventh example of the invention, showing two opposing bit-locking elements one acting in one direction and the other acting in the opposite direction.
FIG. 16B is an end view corresponding to FIG. 16A.

FIGS. 16A and 16B show a seventh example of the invention, which is an enhanced version of the sixth example (FIGS. 15A and 15B). In this enhanced version, the bit can be locked in both axial directions by a dual-biased sliding sleeve 20. One locking element 42 locks the bit against movement in one direction, and the other locking element 42' locks the bit against movement in the other direction. The locking elements can be operated for bit release in one direction at a time. The extended anchoring portions 24 of the sleeve 20 have an open ended slot and another closed slot anchoring the locking elements.

Figure 16C:
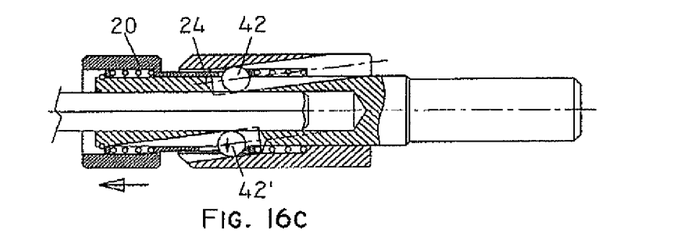
FIG. 16C is a side cross-section of the seventh example, showing the sleeve moved forwardly from the holder.
Figure 16D:
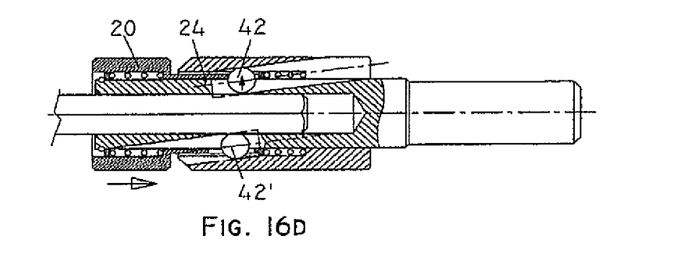
FIG. 16D is a side cross-section of the seventh example, showing the sleeve moved rearwardly.
Figure 17A:
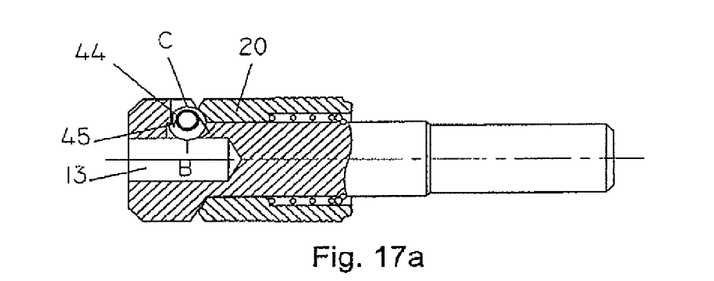
FIG. 17A is a side cross-section of an eighth example of the invention, using a spring-loaded cam.
Figure 17B:
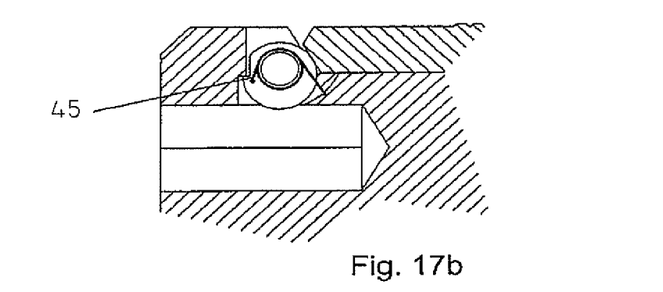
FIG. 17B is a detailed view corresponding to FIG. 17A.
Figure 18:
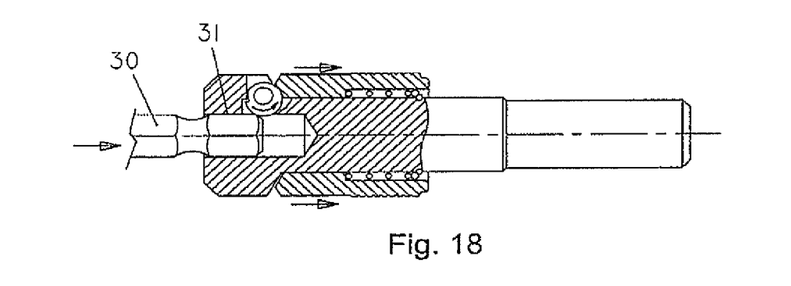
FIG. 18 is a side cross-section showing a bit being inserted.
Figure 19:
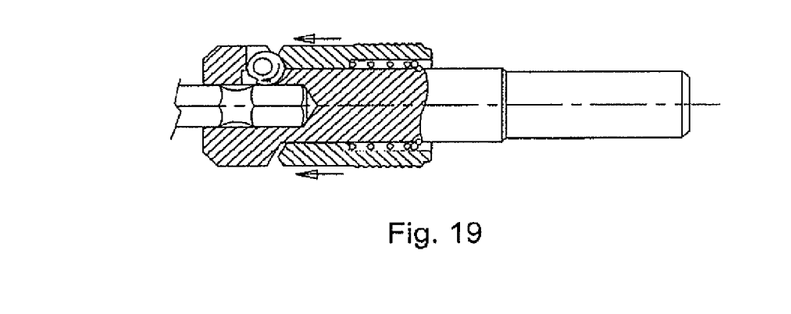
FIG. 19 is a side cross-section showing the bit locked in place.

FIG. 16C shows the sleeve 20 pushed forward from the holder. This forward movement of the sleeve forces the locking element 42' angularly away from the tool bit and thus frees the bit to be pushed deeper into the blind hole. FIG. 16D shows sleeve 20 pushed rearwardly, moving the locking element 42 away from the bit, hence freeing the bit to be extracted from the holder.

FIGS. 17A-19 show an eighth and somewhat different example, where the bit locking element is at least one rotatable eccentric cam 44. This cam is lightly spring biased in a counter-clockwise direction by a spring 45. Point 'B' is the highest on the peripheral surface of the eccentric cam while point 'C is the lowest. A slideable sleeve 20 is strongly biased towards the open end of bit insertion bit-accepting hole 13, keeping the eccentric cam 44 pushed in a clockwise direction such that the highest portion 'B' extends into the bit-accepting hole 13. As the tool bit 30 is inserted into the matching bit-accepting hole 13 of the holder, the eccentric cam 44 is pushed into counterclockwise rotation until it rides on the bit surface 31, at the same time pushing the sleeve 26 back against its bias. Thus the cam 44 acts as a rotating wedge clamping the tool bit 30 within the bit-accepting hole 13 of the holder. Any effort to pull out the tool bit tends to rotate the eccentric cam 44 in a clockwise direction, resulting in further tightening the grip on the bit. In order to release the tool bit, the sleeve 26 must be pulled back against axial spring bias, allowing cam 44 to rotate counter-clockwise, thus releasing clamping force on the bit for removal.

Figure 20:
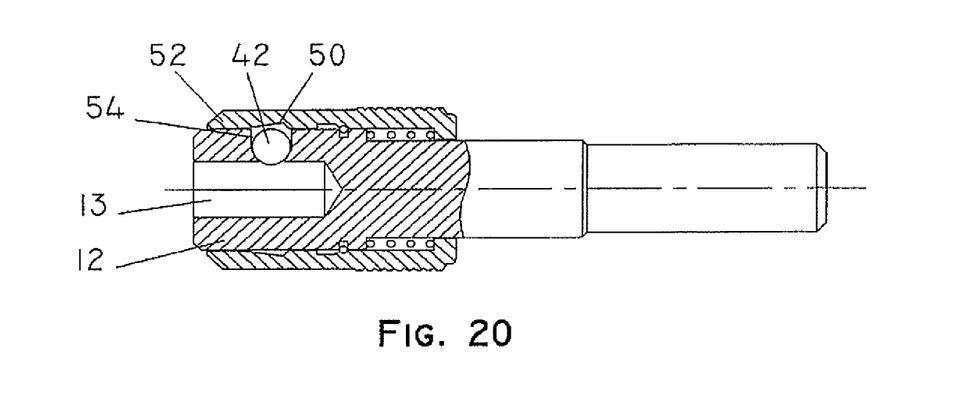
FIG. 20 is a side cross-section of a ninth example of the invention, in which a wedge portion is provided on the inner diameter of a slideable sleeve.
Figure 21:
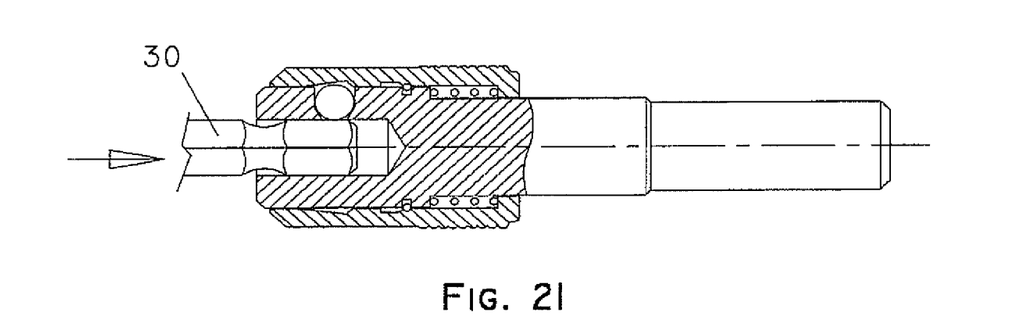
FIG. 21 is a corresponding view, showing a bit being inserted.
Figure 22:
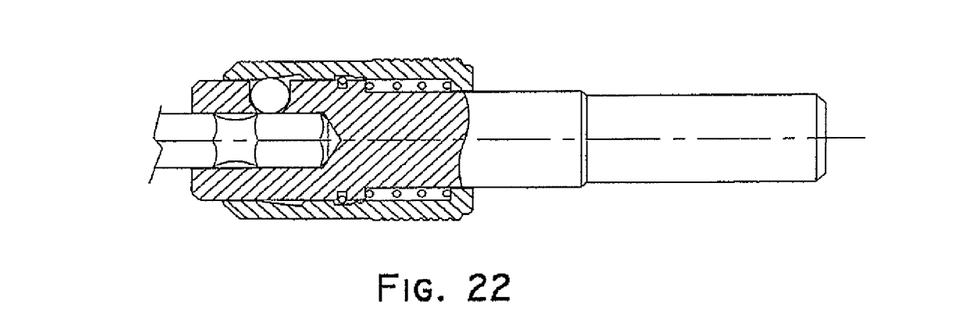
FIG. 22 is a corresponding view, showing the bit locked in place.

FIGS. 20-22 show a ninth example, in which the wedge portion 50 is provided on the inner diameter of a slideable sleeve 52, the sleeve being biased towards the shank of the bit holder. The axial bias of the slideable wedge causes radial movement of a locking element 42 sitting in a radial hole 54 in the body, the hole communicating with the bit-accepting recess 13 in the holder body. The sleeve 52 is pushed against the bias of the spring, towards the front end of the holder to insert the tool bit into the accepting bit-accepting hole 13. Once the bit is fully inserted, the sleeve is released, resulting in locking of the tool bit due to the radial force of the locking element. To release the bit 30, the sleeve is pushed forward.

Figure 23:
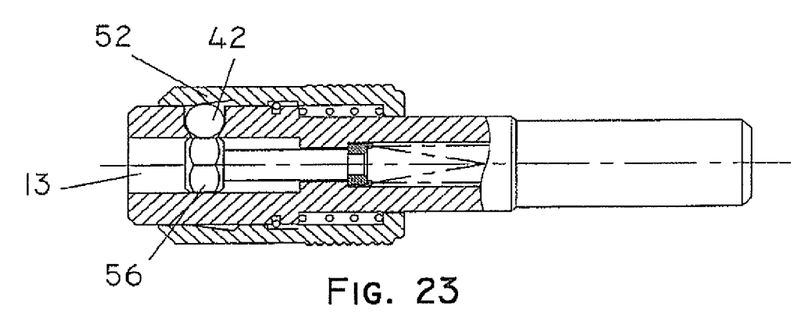
FIG. 23 is a side cross-section of a tenth example of the invention, similar to the ninth example, but having a spring-loaded plunger to eject the tool bit when the locking mechanism is released.
Figure 24:
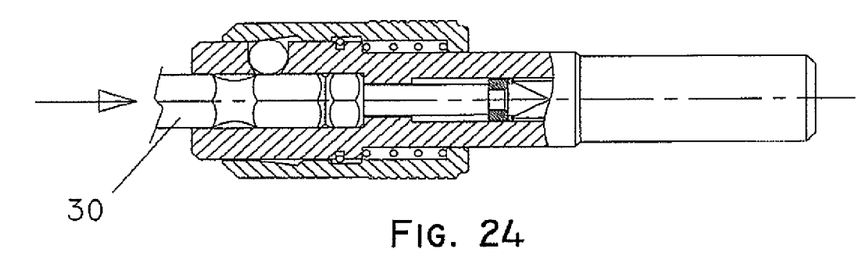
FIG. 24 is a corresponding view, showing a bit fully inserted.
Figure 25:
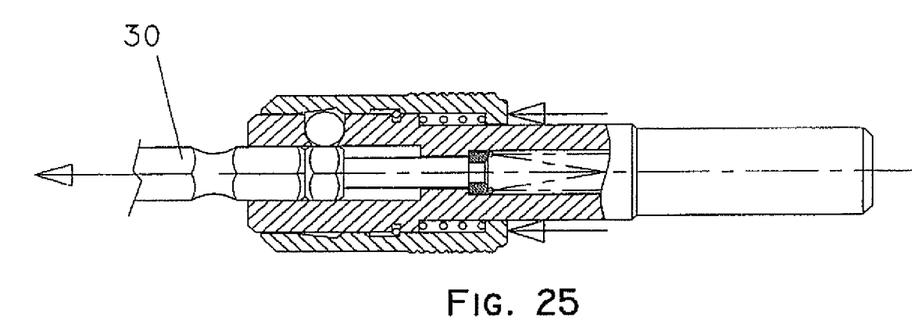
FIG. 25 is a corresponding view, showing the collar being pushed forward and the bit being ejected.

FIG. 23-25 show a tenth example, similar to the ninth example (FIGS. 20-22). This tenth example provides automatic locking of the bit 30 on insertion. In order to release the bit 30, the sleeve 52 is pushed against the spring bias, resulting in taking the radial force off the locking element 42, such that the tool bit is then ejected by a spring-loaded plunger 56. FIG. 24 shows a bit fully inserted, and FIG. 25 shows the collar being pushed forward and the bit being ejected.

For clarity and simplicity, most drawings do not show where the mechanism is installed. However, the usual and typical application is to mount the mechanism in a screwdriver (bit-driver) handle. FIG. 26 is a side cross-section showing a mechanism according to the invention, mounted in a typical screwdriver/bitdriver handle 100. Obviously any one of the described examples of the invention can be so mounted.

It will be evident to those knowledgeable in the field of the invention that many variations on the examples described above are conceivable within the scope of the invention. It should therefore be understood that the claims which define the invention are not restricted to the specific examples described above. Possible variations include, for example, the shape of the pin, the structure of the connectivity and the shape of the tool bit profile.

Figure 27:
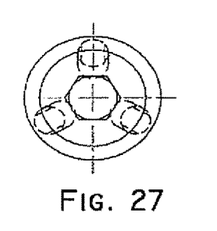
FIG. 27 is an end view showing three locking mechanisms offset by 120 degrees from each other.
Figure 28:
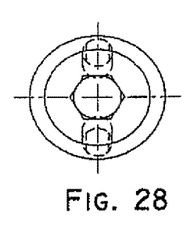
FIG. 28 is an end view showing two locking mechanisms offset by 180 degrees from each other.
Figure 29:
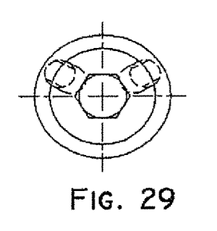
FIG. 29 is an end view showing two locking mechanisms offset by 120 degrees from each other.

Most of the examples described above show a single locking mechanism, for clarity of illustration, and for most applications a single mechanism may suffice. However, it should also be appreciated that there can be more than one bit-locking mechanism. For example, FIG. 27 shows three such mechanisms positioned at 120 degrees to each other, to engage three of the faces of a hexagonal tool bit. Obviously, two opposing mechanisms could also be used, as shown in FIG. 28. FIG. 29 shows another example, where there are two mechanisms, offset by 120 degrees. Theoretically there could be six mechanisms, but clearly that would neither be necessary nor practical.

It should also be appreciated that although most of the tool bits illustrated in the accompanying drawings are shown with a conventional circumferential groove near the proximal end of the bit, it is an advantage of this invention that the groove is not required for locking, unlike most prior art locking mechanisms. The locking means, whether a pin or a roller or a ball or other, engages a flat portion of the tool bit, such that no groove is required. See FIGS. 10B and 16A for specific examples of tool bits without grooves. However, it should be seen that in the other drawings, even when the tool bit does have a conventional groove, that groove is not engaged.

Figure 30:
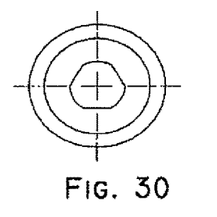
FIG. 30 is and end view showing an alternative bit and bit holder cross-section, namely tri-centric.
Figure 31:
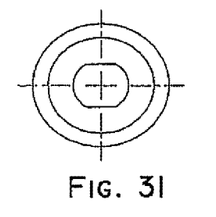
FIG. 31 is and end view showing another alternative bit and bit holder cross-section, namely ovaloid.

It should also be appreciated, as stated previously, that the tool bit does not need to be a conventional hexagonal cross-section. Other non-circular cross-sections can be used, such as those shown in FIGS. 30 and 31 (tri-centric and ovaloid respectively).

Further variations may be apparent or become apparent to those knowledgeable in the field of the invention, within the scope of the invention as defined by the claims which follow.

The invention claimed is:

1. A bit holder having a shank at a proximal end thereof and a blind bit-accepting hole at a distal end thereof, said bit-accepting hole being shaped to receive a correspondingly-shaped tool bit, the bit holder having at least one locking mechanism comprising a first angled path defined in said bit holder, opening into a side of said bit-accepting hole, extending away from said bit-accepting hole at an acute angle from a central axis of said bit holder toward the proximal end, and a first locking element slideable in said first angled path, such that a portion of said first locking element associated with the distal end extends slightly into said bit-accepting hole, said bit holder further comprising a sleeve mounted around the body of the bit holder, the sleeve biased by a spring to urge said first locking element towards said bit-accepting hole, connected to said first locking element such that moving said sleeve towards the proximal end retracts said first locking element from said bit-accepting hole, wherein said first locking element comprises a ball and wherein said sleeve has a hook portion extending therefrom to capture said ball the bit holder further comprising a second angled path defined in said bit holder, opening into a side of said bit-accepting hole, extending away from said bit-accepting hole at an acute angle from a central axis of said bit holder toward the distal end, and comprising a second locking element slideable in said second angled path, the sleeve connected to said second locking element, whereby said tool bit is locked against movement towards either the proximal end and the distal end until said sleeve is moved.

2. A bit holder as in claim 1, comprising more than one said locking mechanism spaced apart radially.

3. A bit holder as in claim 1, further comprising a spring-loaded plunger mounted in a proximal end of said blind bit-accepting hole, to eject said tool bit when said locking element is released by moving said sleeve.

4. A bit holder as in claim 1, wherein said tool bit and said bit-accepting hole are hexagonal in cross-section.

5. A bit holder as in claim 1, wherein said tool bit and said bit-accepting hole are non-circular in cross-section.

6. A bitdriver comprising a bit holder as in claim 1, and having a handle mounted on said shank.

\* \* \* \* \*